United States Patent
Spitzer et al.

(10) Patent No.: US 8,767,305 B2
(45) Date of Patent: Jul. 1, 2014

(54) METHOD AND APPARATUS FOR A NEAR-TO-EYE DISPLAY

(75) Inventors: Mark B. Spitzer, Sharon, MA (US); Xiaoyu Miao, Sunnyvale, CA (US); Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 140 days.

(21) Appl. No.: 13/196,212

(22) Filed: Aug. 2, 2011

(65) Prior Publication Data

US 2013/0033756 A1   Feb. 7, 2013

(51) Int. Cl.
  *G02B 27/14* (2006.01)
  *G02B 27/01* (2006.01)

(52) U.S. Cl.
  CPC ............ *G02B 27/0172* (2013.01); *G02B 27/01* (2013.01)
  USPC ........................................ 359/630

(58) Field of Classification Search
  USPC ........................................ 359/13, 630, 632
  See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,943,171 A | 8/1999 | Budd et al. |
| 5,949,583 A | 9/1999 | Rallison et al. |

(Continued)

FOREIGN PATENT DOCUMENTS

| | | |
|---|---|---|
| GB | 2272980 A | 6/1994 |
| JP | 2007-156096 | 6/2007 |

(Continued)

OTHER PUBLICATIONS

PCT/US2012/046306; PCT International Search Report and Written Opinion of the International Searching Authority, mailed Jan. 21, 2013, 10 pages.

(Continued)

*Primary Examiner* — Mahidere Sahle
(74) *Attorney, Agent, or Firm* — Blakely Sokoloff Taylor & Zafman LLP (57) ABSTRACT

An eyepiece for a head mounted display includes an illumination module, an end reflector, a viewing region, and a polarization rotator. The illumination module provides CGI light along a forward propagation path within the eyepiece. The end reflector is disposed at an opposite end of the eyepiece from the illumination module to reflect the CGI light back along a reverse propagation path within the eyepiece. The viewing is disposed between the illumination module and the end reflector and includes an out-coupling polarizing beam splitter ("PBS"). The out-coupling PBS passes the CGI light traveling along the forward propagation path and redirects the CGI light traveling along the reverse propagation path out of an eye-ward side of the eyepiece. The polarization rotator is disposed in the forward and reverse propagation paths between the out-coupling PBS and the end reflector.

18 Claims, 8 Drawing Sheets

(56) References Cited

U.S. PATENT DOCUMENTS

| | | | |
|---|---|---|---|
| 6,023,372 A | 2/2000 | Spitzer et al. | |
| 6,043,591 A | 3/2000 | Gleckman | |
| 6,091,546 A | 7/2000 | Spitzer | |
| 6,172,657 B1 | 1/2001 | Kamakura et al. | |
| 6,201,629 B1 | 3/2001 | McClelland et al. | |
| 6,204,974 B1 | 3/2001 | Spitzer | |
| 6,222,677 B1 | 4/2001 | Budd et al. | |
| 6,331,916 B1 * | 12/2001 | Mukawa | 359/630 |
| 6,335,838 B1 | 1/2002 | Kasai et al. | |
| 6,349,001 B1 | 2/2002 | Spitzer | |
| 6,353,492 B2 | 3/2002 | McClelland et al. | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,538,799 B2 | 3/2003 | McClelland et al. | |
| 6,618,099 B1 | 9/2003 | Spitzer | |
| 6,690,516 B2 | 2/2004 | Aritake et al. | |
| 6,693,749 B2 | 2/2004 | King et al. | |
| 6,701,038 B2 | 3/2004 | Rensing et al. | |
| 6,724,354 B1 | 4/2004 | Spitzer | |
| 6,738,535 B2 | 5/2004 | Kanevsky et al. | |
| 6,747,611 B1 | 6/2004 | Budd et al. | |
| 6,771,424 B1 * | 8/2004 | Amafuji et al. | 359/632 |
| 6,829,095 B2 | 12/2004 | Amitai | |
| 6,879,443 B2 | 4/2005 | Spitzer et al. | |
| 6,880,931 B2 | 4/2005 | Moliton et al. | |
| 7,158,096 B1 | 1/2007 | Spitzer | |
| 7,242,527 B2 | 7/2007 | Spitzer et al. | |
| 7,391,573 B2 | 6/2008 | Amitai | |
| 7,457,040 B2 | 11/2008 | Amitai | |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitari | |
| 7,843,403 B2 | 11/2010 | Spitzer | |
| 7,900,068 B2 | 3/2011 | Weststrate et al. | |
| 8,004,765 B2 | 8/2011 | Amitai | |
| 2003/0090439 A1 | 5/2003 | Spitzer et al. | |
| 2005/0007672 A1 | 1/2005 | Wu | |
| 2005/0174651 A1 | 8/2005 | Spitzer et al. | |
| 2005/0219152 A1 | 10/2005 | Budd et al. | |
| 2006/0192306 A1 | 8/2006 | Giller et al. | |
| 2006/0192307 A1 | 8/2006 | Giller et al. | |
| 2008/0219025 A1 | 9/2008 | Spitzer et al. | |
| 2008/0241537 A1 | 10/2008 | Sennett et al. | |
| 2009/0122414 A1 | 5/2009 | Amitari | |
| 2010/0046070 A1 | 2/2010 | Mukawa | |
| 2010/0079356 A1 | 4/2010 | Hoellwarth | |
| 2010/0103078 A1 | 4/2010 | Mukawa et al. | |
| 2010/0149073 A1 | 6/2010 | Chaum et al. | |
| 2010/0278480 A1 | 11/2010 | Vasylyev et al. | |
| 2011/0096100 A1 * | 4/2011 | Sprague | 345/690 |
| 2011/0213664 A1 | 9/2011 | Osterhout et al. | |

FOREIGN PATENT DOCUMENTS

| | | |
|---|---|---|
| JP | 2007-156096 A1 | 6/2007 |
| WO | WO96/05533 A1 | 2/1996 |
| WO | WO 2009/136393 A1 | 11/2009 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

English translation of JP 2007-156096, Machine Translation performed by Google Translate function, Mar. 28, 2013, 17 pages.

* cited by examiner

METHOD AND APPARATUS FOR A NEAR-TO-EYE DISPLAY

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, field of view, and efficiency of conventional optical systems used to implemented existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system, apparatus, and method of operation for a head mounted display ("HMD") eyepiece. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
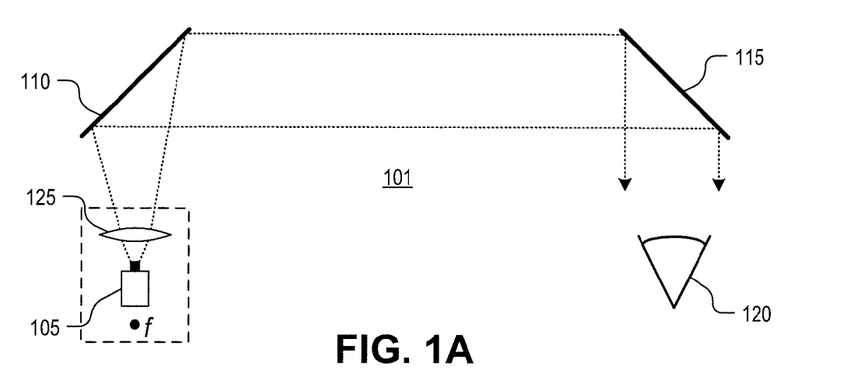
FIG. 1A illustrates a first conventional near-to-eye optical system using an input lens and two mirrors.

FIG. 1A illustrates a first conventional near-to-eye optical system 101 using an input lens and two mirrors. An image source 105 outputs an image that is reflected by two mirrors 110 and 115, which form an image near to eye 120. Image source 105 is typically mounted above the head or to the side of the head, while mirrors 110 and 115 bend the image around the front of the viewer's face to their eye 120. Since the human eye is typically incapable of focusing on objects placed within a few centimeters, this system requires a lens 125 interposed between the first mirror 110 and image source 105. Lens 125 creates a virtual image that is displaced further back from the eye than the actual location of mirror 115 by positioning image source 105 inside of the focal point f of lens 125. Optical system 101 suffers from a relatively small field of view limited by the extent of mirrors 110 and 115 and the bulkiness of lens 125. The field of view can be marginally improved by placing mirrors 110 and 115 within a high index material to compress the angles of incidence, but is still very limited and the thickness of the waveguide rapidly increases to achieve larger fields of view.

Figure 1B:
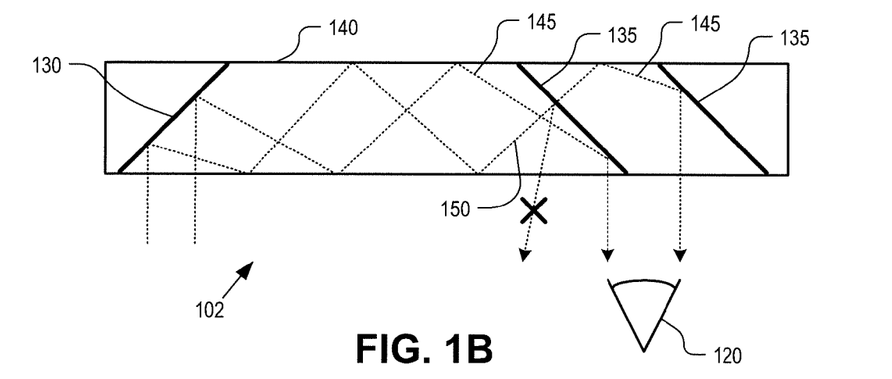
FIG. 1B illustrates a second conventional near-to-eye optical system using angle sensitive dichroic mirrors.

FIG. 1B illustrates a second conventional near-to-eye optical system 102 using angle sensitive dichroic mirrors. Optical system 102 includes a single in-coupling mirror 130 and two out-coupling dichroic mirrors 135 disposed within a waveguide 140. This system uses collimated input light from virtual images placed at infinity and uses total internal reflection ("TIR") to guide the input light down waveguide 140 towards out-coupling dichroic mirrors 135. In order to produce a useful image at eye 120, each incident angle of input light should correspond to a single output angle of emitted light. Since light can potentially reflect off of output mirrors 135 on either a downward trajectory (ray segments 145) or an upward trajectory (ray segments 150), each input angle can potentially result in multiple output angles, thereby destroying the output image. To overcome this problem, optical system 102 uses angle sensitive dichroic mirrors 135 that pass light with incident sufficiently close to normal while reflecting light having a sufficiently oblique incidence. However, the nature of dichroic mirrors 110 that passes some incident angles while reflecting others, limits the field of view of optical system 100 and reduces the optical efficiency of the system. In addition, these dichroic mirror coatings do not provide sharp angular cutoffs, resulting in ghosting effects. Lastly the angle sensitive dichroic mirror coating requires a complicated and customized coating design, which is not cost effective.

Figure 1C:
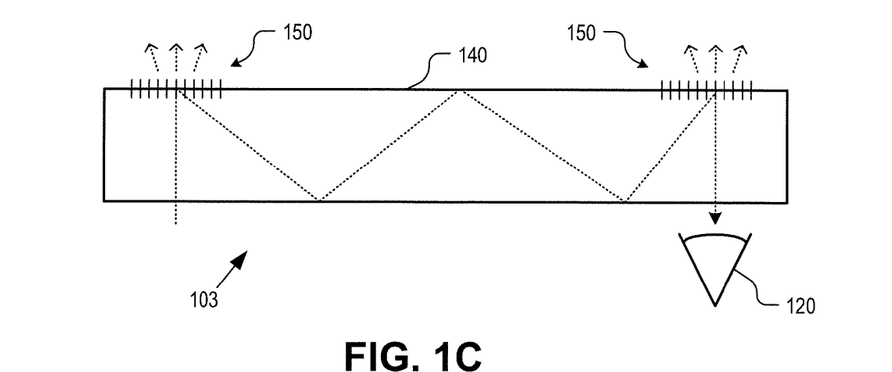
FIG. 1C illustrates a third conventional near-to-eye optical system using holographic diffraction gratings.

FIG. 1C illustrates a third conventional near-to-eye optical system 103 using holographic diffraction gratings. Optical system 103 is similar to optical system 102, but uses holographic diffraction gratings 150 in place of mirrors 130 and 135. Diffraction gratings 150 are inefficient reflectors, since they only reflect higher order diffractions while passing the first order diffraction, which contains the largest portion of energy in an optical wave front. In addition to being poor optical reflectors, the input and output diffraction gratings must be precisely tuned to one another, else the output image will suffer from color separation. Achieving a sufficient match between the input and output gratings 150 requires extreme control over manufacturing tolerances, which is often difficult and costly.

Figure 2:
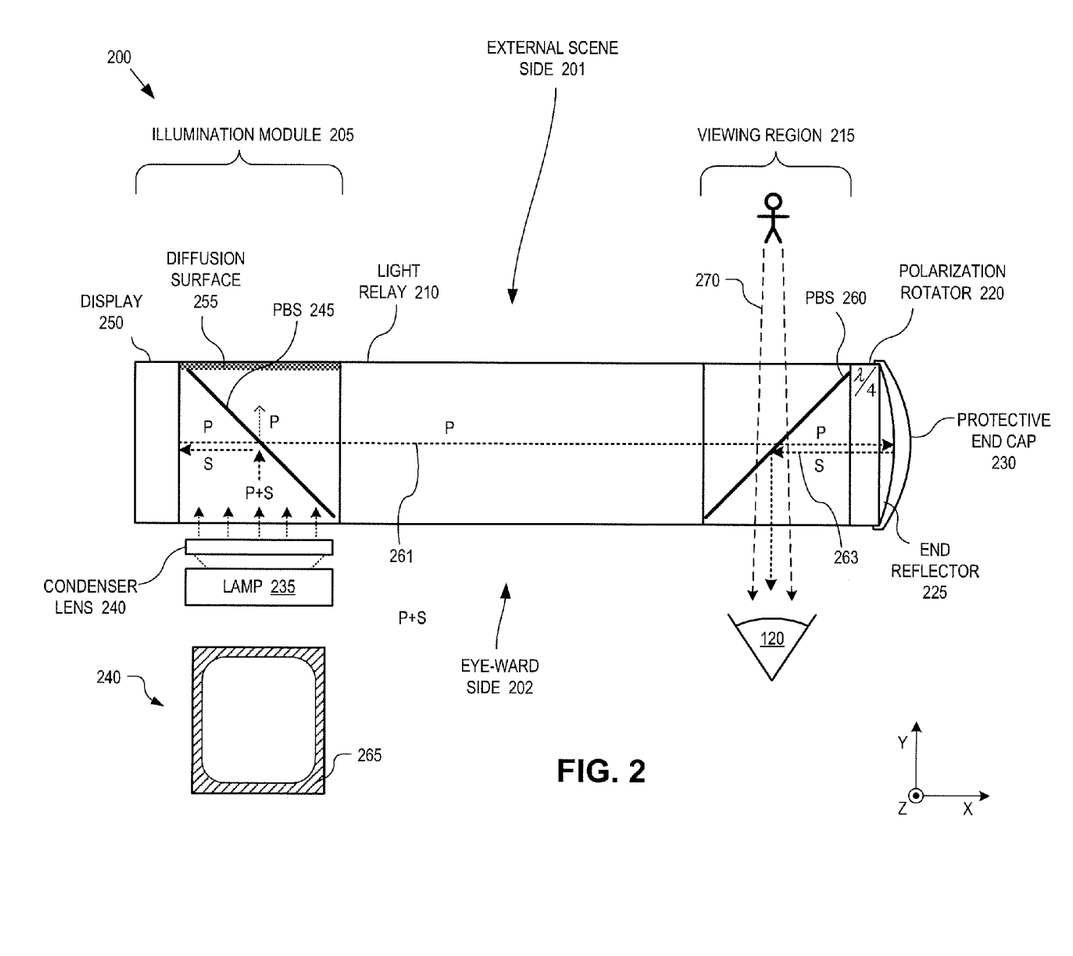
FIG. 2 is a top cross-sectional view of an eyepiece, in accordance with an embodiment of the disclosure.
Figure 3A:
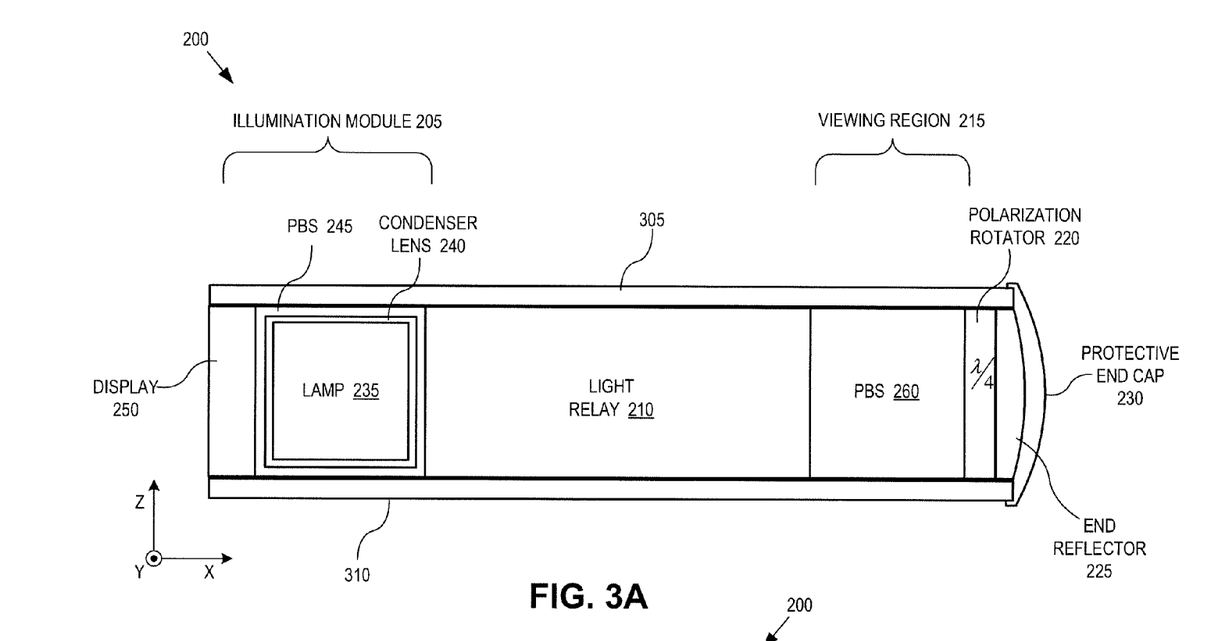
FIG. 3A is a side view of the eyepiece, in accordance with an embodiment of the disclosure.
Figure 3B:
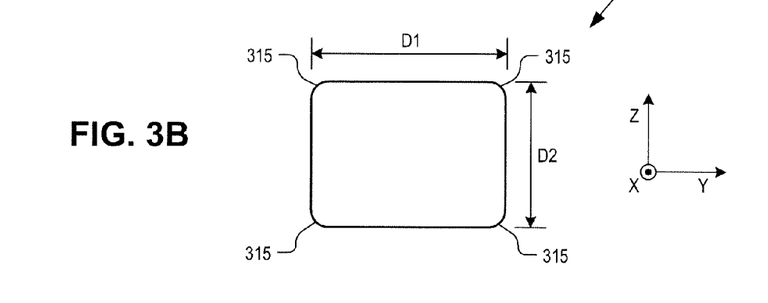
FIG. 3B is a cross-sectional view through the light relay section of the eyepiece, in accordance with an embodiment of the disclosure.

FIGS. 2, 3A, and 3B illustrate an eyepiece 200, in accordance with an embodiment of the disclosure. FIG. 2 illustrates a top cross-sectional view of eyepiece 200 while FIG. 3A illustrates a side view and FIG. 3B illustrates a cross-sectional end view of the same. The illustrated embodiment of eyepiece 200 includes an illumination module 205, a light relay 210, a viewing region 215, a polarization rotator 220, an end reflector 225, and a protective end cap 230. The illustrated embodiment of illumination module 205 includes a lamp 235, a condenser lens 240, an in-coupling polarizing beam splitter ("PBS") 245, a display 250 (e.g., liquid crystal on silicon panel), and a diffusion surface (e.g., frosted surface) 255. The illustrated embodiment of viewing region 215 includes an out-coupling PBS 260.

Lamp 235 may be implemented using a light emitting diode ("LED") source (or multi-color LED array), which illuminates display 250 via reflection off of in-coupling PBS 245. In-coupling PBS 245 may be implemented as a discrete PBS block to which lamp 235, condenser lens 240, and display 250 are bonded. In-coupling PBS 245 operates to substantially pass light of a first linear polarization (e.g., pass greater than 90% of P polarization) while substantially reflecting light of a second polarization (e.g., reflect greater than 99% of S polarization). The two linear polarizations are typically orthogonal linear polarizations. Display 250 (e.g., LCOS, LCD panel, etc.) imparts image data onto the illumination light output by lamp 235 to output computer generated image ("CGI") light via selective reflection by an array of image pixels. Reflection by display 250 rotates the polarization of the incident lamp light by 90 degrees.

Display 250 is disposed on the opposite side of eyepiece 200 from end reflector 225 in an opposing configuration such that it is directly facing end reflector 225. Upon reflection of the incident lamp light, the CGI light propagates down eyepiece 200 along a forward propagation path 261. In one embodiment, the CGI light is directed down eyepiece 200 along forward propagation path 261 without need of total internal reflection ("TIR"). In other words, the cross sectional shape and divergence of the light cone formed by the CGI light is confined such that the light rays reach end reflector 225 without TIR off the sides of light relay 210. In one embodiment, the light cone divergence angle (e.g., 15 degrees) is controlled by condenser lens 240. In one embodiment, the light cone cross-sectional shape is also controlled by a blackout film 265 patterned onto condenser lens 240. In other embodiments, blackout film 265 may be disposed elsewhere, such as at the interface between the block structure of PBS 245 and display 250, at an interface between the block structure of PBS 245 and light relay 210, on slanted in-coupling PBS 245 itself, or otherwise.

In the illustrated embodiment, display 250 is mounted to the block structure of PBS 245. Since display 250 is disposed on the end surface of eyepiece 200, display 250 may be mounted in either a portrait orientation or a landscape orientation, simply by rotating display 250. By rotating display 250, eyepiece 200 can be configured to display the CGI in either portrait or landscape modes.

Figure 6:
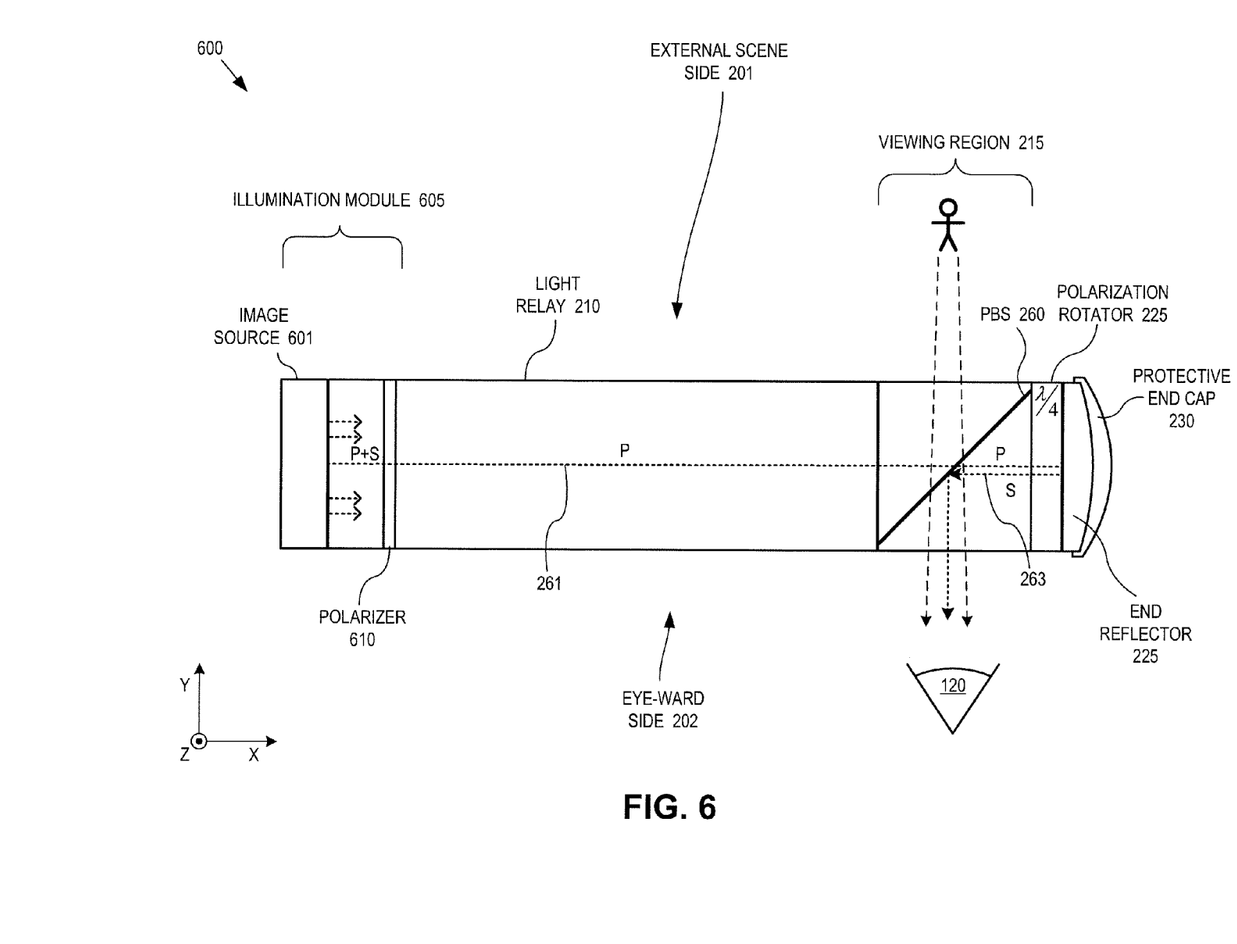
FIG. 6 is a top cross-sectional view of an eyepiece including an image source that directly opposes an end reflector, in accordance with an embodiment of the disclosure.

While FIGS. 2 and 3A illustrate illumination module 205 implemented using lamp 235 and display 250 to implement an image source, various other image source technologies may be used. FIG. 6 discussed below illustrates another image source implementation example that uses other image source technologies, such as a back lit liquid crystal display ("LCD"), an organic LED ("OLED"), a quantum dot array, or otherwise.

Light relay 210 is disposed between illumination module 205 and viewing region 215. Light relay 210 has a transparent structure to permit the CGI light to pass through along forward propagation path 261. Light relay 210 may be fabricated of a solid transparent material (e.g., glass, quartz, acrylic, clear plastic, PMMA, ZEONEX-E48R, etc.) or be implemented as a solid housing having an inner air gap through which the CGI light passes. Light relay 210 operates as a light pipe to protect the optical path, but may not use TIR to guide or confine the CGI light. In one embodiment, light relay 210 has a length (as measured parallel to forward propagation path 261) selected such that the focal plane of end reflector 225 substantially coincides with an emission aperture of display 250. To achieve focal plane alignment with the emission aperture of display 250, both the length of light relay 210 and the radius of curvature of end reflector 225 may be selected in connection with each other.

The illustrated embodiment of viewing region 215 includes a reflective surface formed by out-coupling PBS 260. In one embodiment, viewing region 215 is partially transparent, which permits external (ambient) scene light 270 to pass through external scene side 201 and eye-ward side 202 of eyepiece 200 to reach eye 120. A partially transparent embodiment facilitates an augmented reality ("AR") where the CGI light is superimposed over external scene light 270 to the user eye 120. In another embodiment, viewing region 215 is substantially opaque (or even selectively opaque), which facilitates a virtual reality ("VR") that immerses the user in the virtual environment displayed by the CGI light.

Out-coupling PBS 260 is configured to pass the same linear polarization (e.g., P polarization) as in-coupling PBS 245, while reflecting the other linear polarization (e.g., S polarization). In the illustrated embodiment, polarization rotator 220 is a quarter wave-plate polarization rotator. The CGI light is rotated 45 degrees along forward propagation path 261 and another 45 degrees along a reverse propagation path 263 after reflection by end reflector 225 for a total of 90 degrees of polarization rotation. In one embodiment, end reflector 230 both reflects and collimates the CGI light such that the CGI light traveling along reverse propagation path 263 is collimated. As previously stated, the focal plane of end reflector 225 may be configured to coincide or nearly coincide with the emission aperture of the image source disposed in illumination module 205. Collimating the CGI light helps eye 120 to focus on the CGI light emitted out eye-ward side 202 in a near-to-eye configuration (e.g., eyepiece 200 placed within 10 cm of eye 120 and typically less than 5 cm of eye 120). The CGI light is directed towards eye 120 due to the oblique orientation (e.g., approximately 45 degrees relative to sides 201 and 202) of out-coupling PBS 260. In other embodiments, end reflector 225 reduces the divergence of the CGI light without fully collimating the CGI light. In yet other embodiments, end reflector 225 is a flat reflective surface.

In an embodiment where end reflector 225 collimates the CGI light, the eyebox (the zone within which eye 120 can see the CGI light) is determined by the projection of out-coupling PBS 260 onto eye-ward side 202. The size of out-coupling PBS 260 is confined by the cross-sectional size and shape of eyepiece 200. Referring to FIG. 3B, in one embodiment, eyepiece 200 may have example cross-sectional dimensions D1=D2=10 mm. In other embodiments, dimensions D1 and D2 need not be equivalent and in one example, D1 maybe half or less of D2 (e.g., 5 mm by 10 mm). The overall length of eyepiece 200 may be selected based upon the temple-to-eye separation distance of a typical user and/or the focal plane distance of end reflector 225. For example, end reflector 225 may have a radius of curvature approximately equal to 80 mm and light relay 210 may have a length approximately equal to 18 mm. Of course other ratios and dimensions may be used.

Referring to both FIGS. 2 and 3A, eyepiece 200 may be fabricated of a series of optically aligned but independent modules. For example, in-coupling PBS 245, light relay 210, and out-coupling PBS 260 may all be fabricated as independent physical elements that are jointed together. These independent physical elements (e.g., volume boxes, cubes, etc.) may share a common cross-sectional shape facilitating a butt connection at planar interface surfaces. In one embodiment, these independent physical elements may be disposed on a single substrate (e.g., either one of upper substrate 305 or lower substrate 310) or even sandwiched between both upper and lower substrates 305 and 310. One or both of substrates 305 and 310 facilitate optical alignment on a planar surface. Furthermore, fine tuning of the optical alignment between the focal plane of end reflector 225 and the emission aperture of display 250 can be achieved during placement of the physical components on one or both of substrates 305 and 310. For example, air gaps can be introduced between light relay 210 and in-coupling PBS 245 and/or out-coupling PBS 260 to achieve the correct separation distance between end reflector 225 and display 250.

Referring to FIG. 3B, the illustrated embodiment of eyepiece 200 includes rounded edges 315 that extend along the elongated length of eyepiece 200. In one embodiment, rounded edges may extend along the entire length of eyepiece 200 including any or all of in-coupling PBS 245, light relay 210, out-coupling PBS 260, polarization rotator 220, and end reflector 225. The individual physical components may be fabricated with rounded edges 315, or the edges may be machine rounded after assembly. Rounded edges 315 may both improve the appearance of eyepiece 200 and improve its eye safety characteristics.

In one embodiment, eyepiece 200 includes protective end cap 230 disposed over the distal end of eyepiece 200. Protective end cap 230 is coated over end reflector 225 and protects the reflective surface to help maintain its optical focusing and reflective properties. In one embodiment, protective end cap 230 is made of a rubberized material and provides additional protection to the user's eye.

Returning to FIG. 2, in one embodiment, eyepiece 200 includes one or more diffusion surfaces 255. Diffusion surfaces 255 may be disposed on a surface of the physical block that includes PBS 245. Diffusion surface 255 may be disposed on the side opposing lamp 235, may be disposed on a bottom side surface adjacent to the surface to which lamp 235 is mounted, and/or may be disposed on a top side surface adjacent to the surface to which lamp 235 is mounted. Diffusion surface(s) 255 may be implemented as a frosted layer (e.g., frosted coating) or by roughing of the side surface(s) of PBS 245. Diffusion surface 255 operates to inhibit TIR off these sides surface to impede unwanted reflections originating at display 250 from entering into light relay 210.

Figure 4:
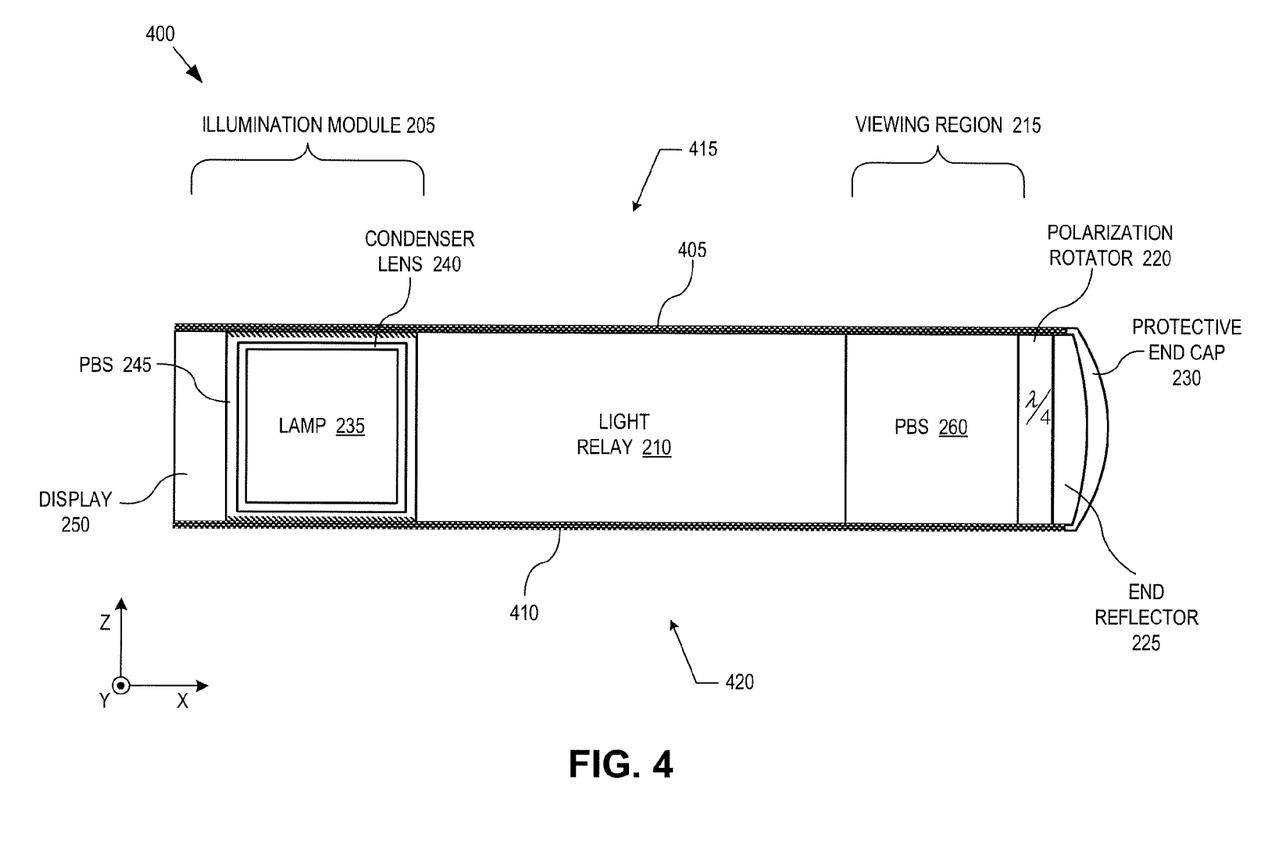
FIG. 4 is a side view of the eyepiece including blackout layers coated on the top and bottom, in accordance with an embodiment of the disclosure.

FIG. 4 is a side view of an eyepiece 400 including blackout layers coated on the top and bottom, in accordance with an embodiment of the disclosure. Eyepiece 400 is similar to eyepiece 200, except that one or both of blackout layers 405 and 410 are disposed on the upper and lower surfaces of eyepiece 400. Blackout layers 405 and 410 operate to block external ambient light from entering into eyepiece 400 from either the upper side surface 415 or the lower side surface 420. However, blackout layers 405 and 410 do not block external scene light 270 from passing through viewing region 215 from external scene side 201 through to eye-ward side 202. Blackout layers 405 and 410 may be disposed along the entire upper and lower side surfaces 415 and 420, including PBS 245, light relay 210, and viewing region 215, or select portions thereof. In one embodiment, blackout layers 405 and 410 may be a dark, opaque paint.

Figure 5:
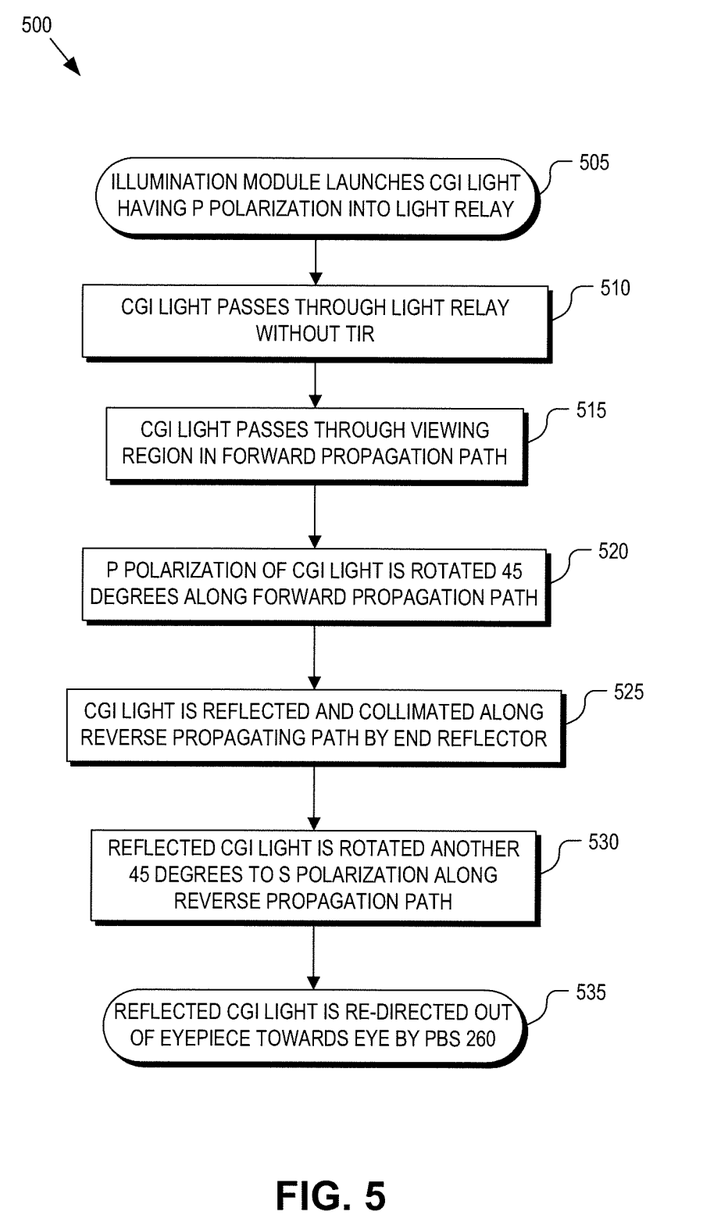
FIG. 5 is a flow chart illustrating a process of operation of the eyepiece to deliver a near-to-eye image to a user, in accordance with an embodiment of the disclosure.

FIG. 5 is a flow chart illustrating a process 500 of operation of eyepiece 200 to deliver a near-to-eye image to a user, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, illumination module launches the CGI light having the P polarization into light relay 210 traveling along forward propagation path 261. In the embodiment illustrated in FIG. 2, the P polarized CGI light is generated as follows. Lamp 235 generates un-polarized light having both P and S polarizations. The divergence of the un-polarized light emitted from lamp 235 is reduced and the beam cross-section limited by condenser lens 240. The un-polarized light is then directed into the side of the physical block or module housing in-coupling PBS 245. In-coupling PBS 245 passes the P polarization components while reflecting the S polarization components. Since in-coupling PBS 245 is obliquely situated relative to lamp 235, the reflected S polarization components are directed onto display 250 (e.g., LCOS panel). Display 250 modulates image data onto the incident lamp light by selectively activating image pixels within the display panel. When an image pixel is activated, it reflects its portion of the lamp light. In so doing, the reflected CGI light has its polarization rotated by 90 degrees to the P polarization. Since in-coupling PBS 245 is substantially transparent to P polarized light, the reflected CGI light passes through in-coupling PBS 245 substantially undisturbed towards light relay 210 along forward propagation path 261. It should be appreciated that the designation of P and S polarizations, whereby P is transmitted and S is reflected is merely demonstrative. Other polarization orientations and transmitted/reflected combinations may be implemented.

In a process block 510, the CGI light passes through light relay 210. In one embodiment, light relay 210 merely provides a separation offset between the image source and end reflector 225 and need not operate to confine or guide the light wave. Thus, in these embodiments, the CGI light passes through light relay 210 without TIR and without external surface reflections.

In a process block 515, the CGI light passes through viewing region 215 along forward propagation path 261. Since out-coupling PBS 260 is configured to substantially pass P polarized light, the CGI light passes through out-coupling PBS 260 substantially without being affected.

In a process block 520, the CGI light then passes through polarization rotator 220 along forward propagation path 261. In so doing, the polarization of the CGI light is rotated by 45 degrees since the illustrated embodiment of polarization rotator 220 is a quarter wave-plate rotator.

In a process block 525, the CGI light is reflected back along reverse propagation path 263 by end reflector 225. In one embodiment, end reflector 225 is a collimating reflector. Thus, in this embodiment, the CGI light travelling along reverse propagation path 263 is substantially collimated light. Collimating the CGI light has an effect of virtually displacing the CGI image at or near infinity thereby helping the human eye 120 to bring the CGI image into focus. Of course, end reflector 225 may reduce the divergence without fully collimating the light, thereby displacing the virtual image at a location less than infinity (e.g., 1 to 3 meters).

In a process block 530, the reflected CGI light traveling along reverse propagation path 263 once again passes through polarization rotator 220, causing the CGI light to be rotated another 45 degrees for a total of 90 degrees from the forward and reverse propagation paths. Thus, after passing through polarization rotator 220 for the second time, the CGI light has an S polarization.

In a process block 535, the CGI light having the S polarization is reflected by out-coupling PBS 260 and redirected out of eyepiece 200 through eye-ward side 202 towards eye 120.

FIG. 6 is a top view of an eyepiece 600 including an image source 601 that directly opposes end reflector 225, in accordance with an embodiment of the disclosure. The illustrated embodiment of eyepiece 600 is similar to eyepiece 200 with the exception of changes to illumination module 605 relative to illumination module 205. Illumination module 605 includes an image source 601 that directly faces end reflector 225 at an opposing side of eyepiece 600. Image source 601 may be implemented with a variety of image source/display technologies including an organic LED ("OLED") panel, a quantum dot array, a back lit LCD, or otherwise. Since image source 601 is disposed on the end of eyepiece 600, illumination module 605 may not include an in-coupling PBS. However, in one embodiment, illumination module 605 includes an input polarizer 610 to polarize the CGI light emitted from image source 601. In other embodiment, input polarizer 610 may be omitted, in which case the out-coupling PBS 260 would reflect the S polarization out external scene side 201, while passing the P polarization towards polarization rotator 225.

Figure 7:
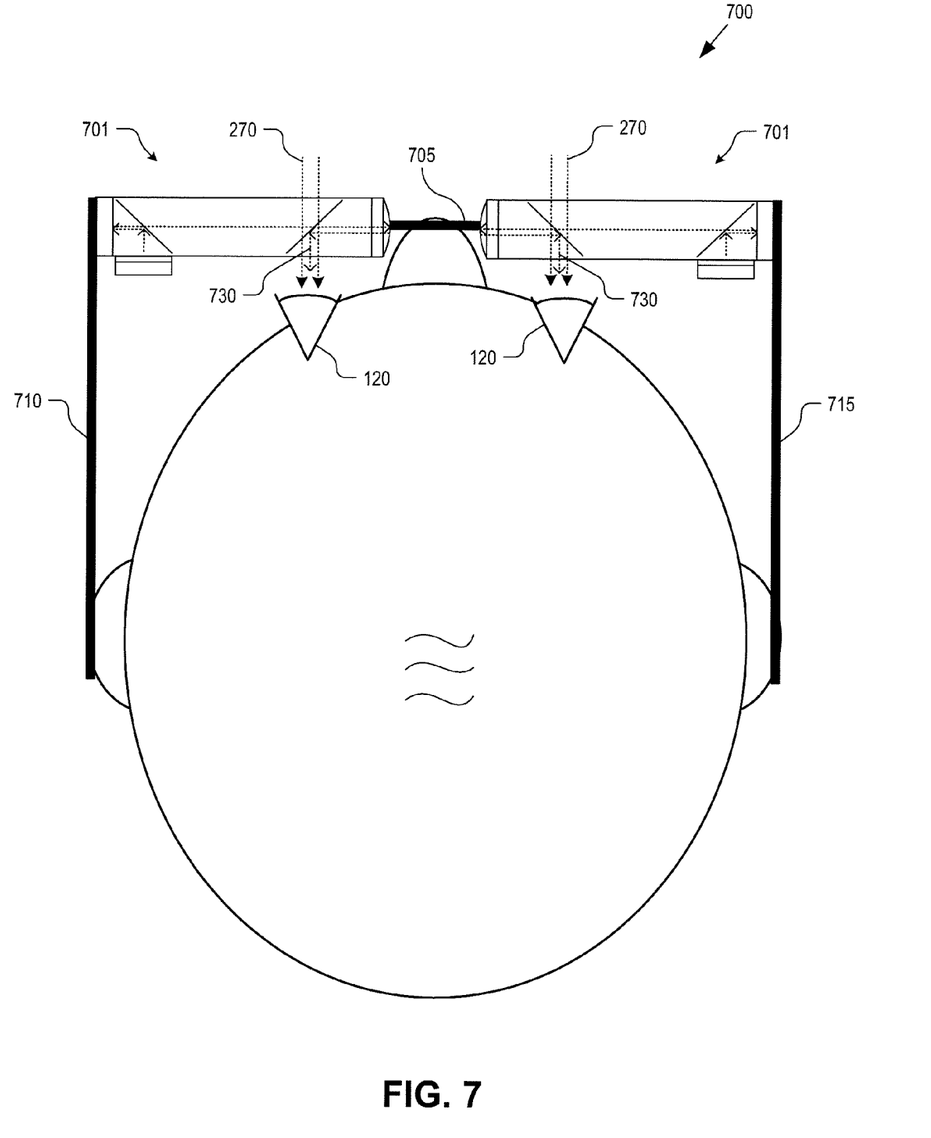
FIG. 7 is a top view of a binocular HMD implemented with eyepieces, in accordance with an embodiment of the disclosure.

FIG. 7 is a top view of a head mounted display ("HMD") 700 using a pair of near-to-eye optical systems 701, in accordance with an embodiment of the disclosure. Each near-to-eye optical system 701 may be implemented with embodiments of either eyepiece 200, eyepiece 400, eyepiece 600, or combinations/variations thereof. The near-to-eye optical systems 701 are mounted to a frame assembly, which includes a nose bridge 705, left ear arm 710, and right ear arm 715. Although FIG. 7 illustrates a binocular embodiment, HMD 700 may also be implemented as a monocular HMD.

The two near-to-eye optical systems 701 are secured into an eye glass arrangement that can be worn on the head of a user. The left and right ear arms 710 and 715 rest over the user's ears while nose assembly 705 rests over the user's nose. The frame assembly is shaped and sized to position a viewing region 215 in front of a corresponding eye 120 of the user. Of course, other frame assemblies having other shapes may be used (e.g., a visor with ear arms and a nose bridge support, a single contiguous headset member, a headband, or goggles type eyewear, etc.).

The illustrated embodiment of HMD 700 is capable of displaying an augmented reality to the user. The viewing region of each eyepiece permits the user to see a real world image via external scene light 270. Left and right (binocular embodiment) CGI light 730 may be generated by one or two CGI engines (not illustrated) coupled to a respective image source of the eyepieces. CGI light 730 is seen by the user as virtual images superimposed over the real world as an augmented reality. In some embodiments, external scene light 270 may be blocked or selectively blocked to provide a head mounted virtual reality display or heads up display.

Figure 8:
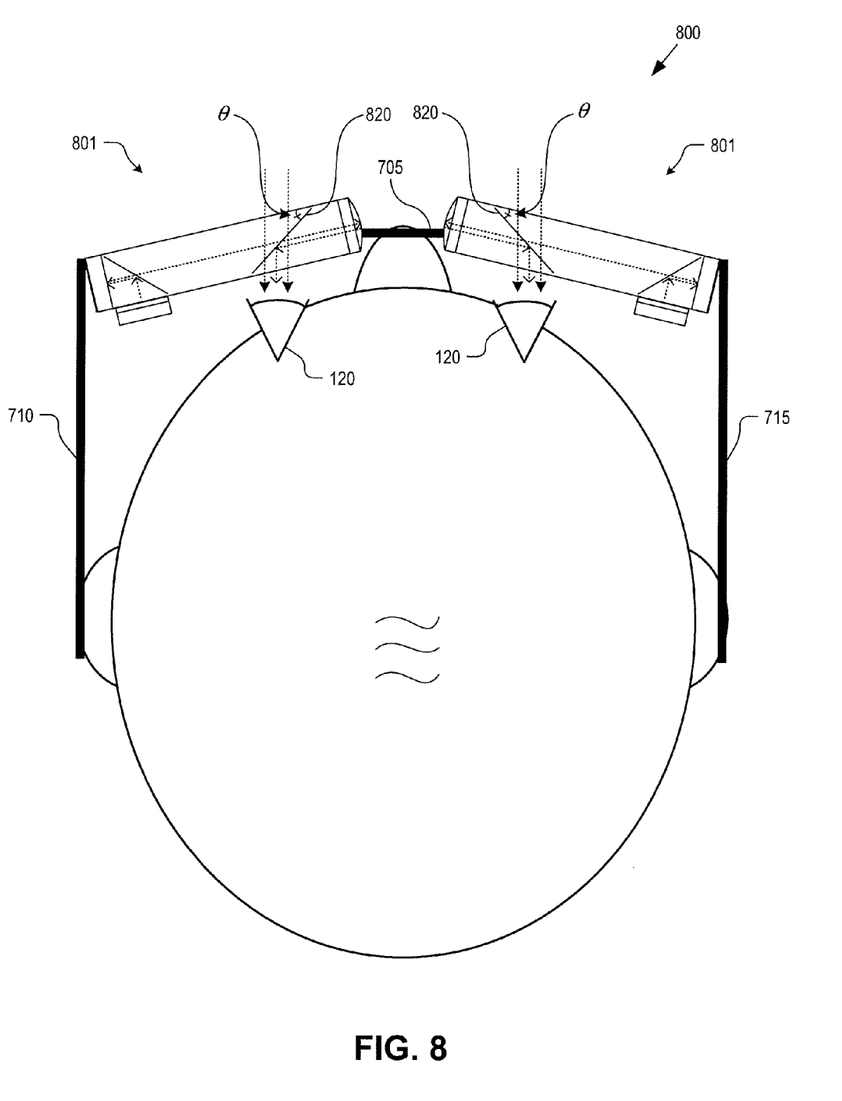
FIG. 8 is a top view of a binocular HMD implemented with angled back eyepieces that approximately follow the contour of the user's head, in accordance with an embodiment of the disclosure.

FIG. 8 is a top view of a binocular HMD 800 implemented with angled back eyepieces 801 that approximately follow the contour of the user's head, in accordance with an embodiment of the disclosure. HMD 800 is similar to HMD 700 except that eyepieces 801 are tilted or angled to better follow the contours of the user's head and provide a more natural and aesthetically pleasing eyeglass structure. However, in order to direct the CGI light into the user's eyes 120 at the appropriate angle, the internal PBS surface 820 in the viewing region needs to be appropriately angled to compensate for the tilt of eyepieces 801. In one embodiment, PBS surface 820 is angled such that is approximately 42 degrees. This is in contrast to the approximately 45 degree orientation in FIG. 7.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece for a head mounted display, the eyepiece comprising:
    an illumination module for providing computer generated image ("CGI") light along a forward propagation path within the eyepiece;
    a concave end reflector disposed at an opposite end of the eyepiece from the illumination module to reflect the CGI light back along a reverse propagation path within the eyepiece;
    a viewing region to be aligned with an eye of a user, the viewing region disposed between the illumination module and the concave end reflector and including an out-coupling polarizing beam splitter ("PBS"), the out-coupling PBS to pass the CGI light traveling along the forward propagation path and to redirect the CGI light traveling along the reverse propagation path out of an eye-ward side of the eyepiece; and
    a polarization rotator disposed in the forward and reverse propagation paths of the CGI light between the out-coupling PBS and the concave end reflector,
    wherein the illumination module comprises:
        an in-coupling PBS;
        a lamp disposed adjacent to the in-coupling PBS to direct illumination light onto the in-coupling PBS;

a display panel disposed opposing and facing the concave end reflector with the in-coupling PBS in between such that the in-coupling PBS redirects the illumination light from the lamp onto the display panel and the display panel reflects the illumination light as the CGI light along the forward propagation path back through the in-coupling PBS; and a diffusion surface disposed opposing and facing the lamp with the in-coupling PBS in between to inhibit unwanted total internal reflections from propagating down the eyepiece from the illumination module to the viewing region.

2. The eyepiece of claim 1, further comprising:
a protective end cap disposed over the concave end reflector at a distal end of the eyepiece to physically protect the concave end reflector.

3. The eyepiece of claim 2, wherein the protective end cap comprises a rubberized end cap to further protect the eye of the user.

4. The eyepiece of claim 1, wherein the concave end reflector comprises a collimating concave mirror to change the CGI light having a cone shape path along the forward propagation path to a substantially collimated path along the reverse propagation path.

5. The eyepiece of claim 1, wherein the concave end reflector has a radius of curvature to virtually displace an image displayed to the user between 1 m and 3 m from the eye of the user.

6. The eyepiece of claim 1, further comprising:
a light relay disposed between the illumination module and the viewing region, wherein the CGI light is directed through the light relay without total internal reflection off side walls of the light relay.

7. The eyepiece of claim 6, wherein the light relay comprises plastic.

8. The eyepiece of claim 6, wherein at least one of a top side or a bottom side of the eyepiece, including at least portions of the illumination module, the light relay, and the viewing region, is coated with a blackout layer to block light from entering the eyepiece through the at least one of the top side or the bottom side while permitting the user to view external scene light through the viewing region.

9. The eyepiece of claim 6, wherein a length of the light relay is selected in connection with a radius of curvature of the concave end reflector such that a focal plane of the concave end reflector substantially coincides with an exit aperture of an image display within the illumination module.

10. The eyepiece of claim 6, wherein the light relay comprises a separate independent physical module from the out-coupling PBS and the illumination module, wherein the light relay is coupled to the out-coupling PBS at a planar interface surface.

11. The eyepiece of claim 10, wherein the independent physical modules of the illumination module, the light relay, and the out-coupling PBS share a common cross-sectional shape.

12. The eyepiece of claim 11, wherein four edges of the eyepiece that extend along an elongated length of the eyepiece, including at least portions of the illumination module, the light relay, and the out-coupling PBS, comprise rounded edges.

13. The eyepiece of claim 6, further comprising:
at least one of an upper substrate or a lower substrate to which the illumination module, the light relay, and the out-coupling PBS are disposed provides mechanical alignment between the illumination module, the light relay, and the out-coupling PBS.

14. The eyepiece of claim 1, wherein the display panel comprises a liquid crystal on silicon ("LCOS") panel.

15. The eyepiece of claim 14, wherein
the diffusion surface is disposed on at least one side of a physical block that comprises the in-coupling PBS.

16. The eyepiece of claim 14, wherein the lamp and the LCOS panel are mounted to the physical block that comprises the in-coupling PBS.

17. The eyepiece of claim 14, wherein the illumination module further comprises:
a condenser lens disposed between the lamp and the in-coupling PBS to reduce divergence of the illumination light emitted from the lamp.

18. An eyepiece for a head mounted display, the eyepiece comprising:
an illumination module for providing computer generated image ("CGI") light along a forward propagation path within the eyepiece;

a concave end reflector disposed at an opposite end of the eyepiece from the illumination module to reflect the CGI light back along a reverse propagation path within the eyepiece;

a viewing region to be aligned with an eye of a user, the viewing region disposed between the illumination module and the concave end reflector and including an out-coupling polarizing beam splitter ("PBS"), the out-coupling PBS to pass the CGI light traveling along the forward propagation path and to redirect the CGI light traveling along the reverse propagation path out of an eye-ward side of the eyepiece;

a polarization rotator disposed in the forward and reverse propagation paths of the CGI light between the out-coupling PBS and the concave end reflector;

a light relay disposed between the illumination module and the viewing region, the light relay comprising a separate independent physical module from the out-coupling PBS and the illumination module; and a blackout layer disposed on a top side of the eyepiece including portions of the illumination module, the light relay, and the viewing region to block light from entering the eyepiece through the top side while permitting the user to view external scene light through an external scene side and the eye-ward side in the viewing region, wherein the illumination module comprises:
an in-coupling PBS;
a lamp disposed adjacent to the in-coupling PBS to direct illumination light onto the in-coupling PBS; and a display panel disposed opposing and facing the concave end reflector with the in-coupling PBS in between such that the in-coupling PBS redirects the illumination light from the lamp onto the display panel and the display panel reflects the illumination light as the CGI light along the forward propagation path back through the in-coupling PBS.

* * * * *